United States Patent
Borgia

[19]

[11] Patent Number: 5,875,996
[45] Date of Patent: Mar. 2, 1999

[54] AIRCRAFT LUGGAGE BOMB PROTECTION SYSTEM

[76] Inventor: Joseph Borgia, 2723 Riverview Dr., Naples, Fla. 34112

[21] Appl. No.: 743,185

[22] Filed: Nov. 5, 1996

[51] Int. Cl.[6] ........................................... B64C 1/20
[52] U.S. Cl. ........................................ 244/118.1; 244/121
[58] Field of Search ............................... 244/118.1, 118.5, 244/137.1, 136, 129.1, 121; 86/50, 49

[56] References Cited

U.S. PATENT DOCUMENTS

| | | |
|---|---|---|
| 4,134,345 | 1/1979 | Baldwin et al. . |
| 4,235,399 | 11/1980 | Shorey . |
| 4,390,152 | 6/1983 | Jorgensen . |
| 5,085,017 | 2/1992 | Hararat-Tehrani . |
| 5,118,053 | 6/1992 | Singh et al. . |
| 5,131,606 | 7/1992 | Nordstrom . |
| 5,195,701 | 3/1993 | Willan . |
| 5,275,361 | 1/1994 | Fray . |

*Primary Examiner*—Robert J. Oberleitner
*Assistant Examiner*—Tien Dinh
*Attorney, Agent, or Firm*—Merrill N. Johnson

[57] ABSTRACT

An aircraft-luggage-bomb protection system has a blow-away plug (1) for each of a plurality luggage-storage units of a cargo section (4) of a commercial airplane (5). Luggage (3) is placed in explosion containers (2, 8, 20) that are positioned over the blow-away plugs. The explosion containers can be structured for select handling equipment such as luggage carts and pallets (23). The cargo sections are structured for quick and easy conversion between passenger use and airfreight use of planes. Procedural methods are provided.

28 Claims, 3 Drawing Sheets

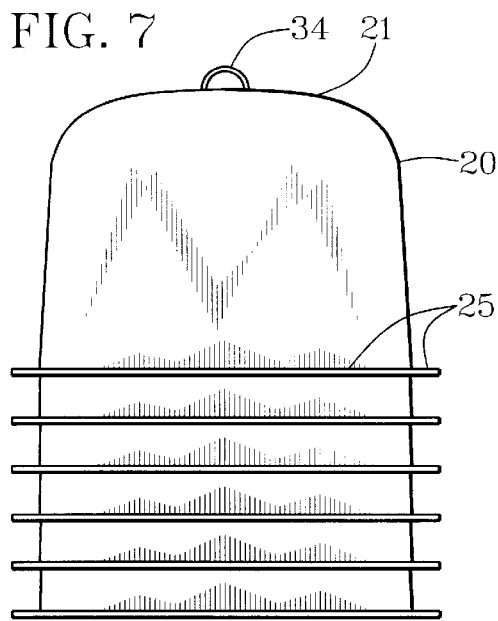
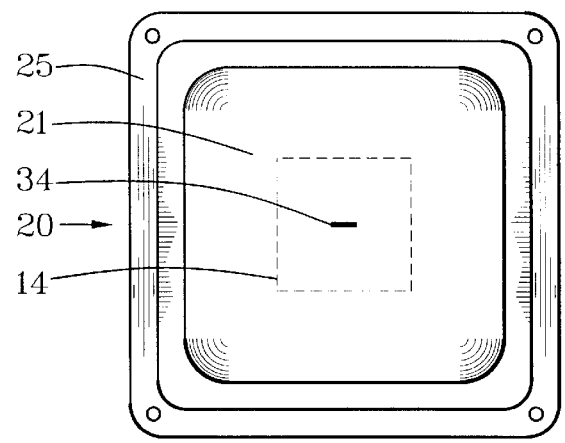
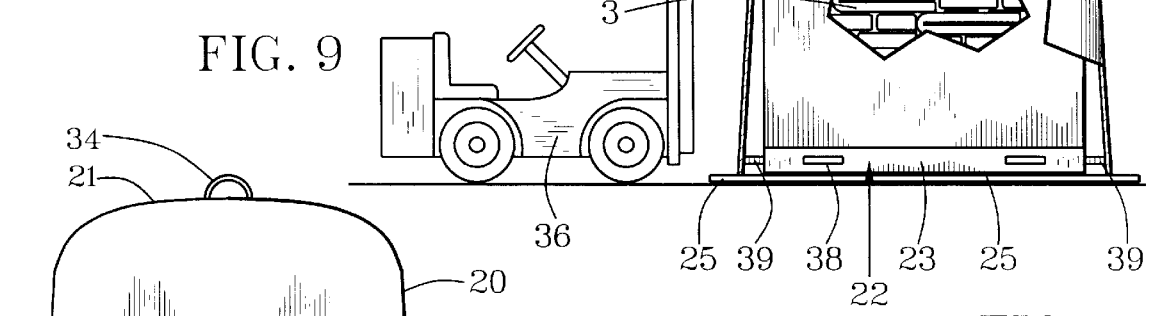
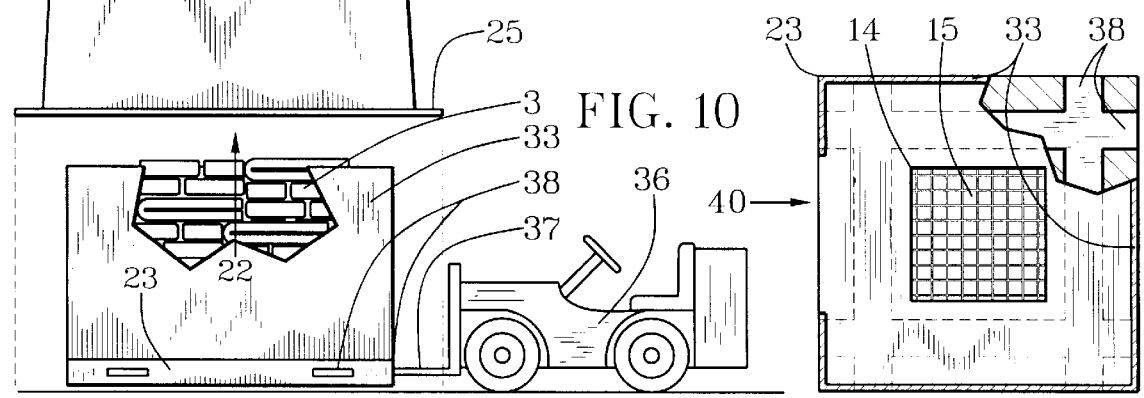

AIRCRAFT LUGGAGE BOMB PROTECTION SYSTEM

BACKGROUND OF THE INVENTION

1. Field of the Invention

This invention relates to protection against terrorist bombing of aircraft and in particular to construction of aircraft and luggage facilities for directing explosive forces from bombs out of cargo holds safely and inexpensively without occurrence of injury to passengers or debilitating damage to aircraft.

2. Relation To Prior Art

Terrorist bombing of aircraft is proliferating in present world conditions. An effective and relatively inexpensive protection of passengers and aircraft against potential harm from luggage-borne bombs is critical. It can discourage their use in addition to protecting passengers and aircraft.

Solutions to date have included bomb-detection systems and explosion-containment systems. None have provided construction of aircraft and cargo facilities to direct explosive forces out of aircraft without occurrence of injury to passengers or debilitating damage to aircraft in a manner taught by this invention.

The most nearly related devices and systems known are those directed at containing explosive forces within aircraft. Examples of these different but related devices for differently protective systems are described in the following patent documents.

U.S. Pat. No. 5,360,129, issued to Lee, described an explosion-containment luggage container with explosive-containment construction on all but one or more weak faces through which explosive forces could be directed against a section of aircraft hull. There was no provision for construction of aircraft to allow escape of the explosion forces without flight-debilitating damage. U.S. Pat. No. 5,267,665, issued to Sanai et al taught an explosion-resistant luggage container that deformed spherically to aid in absorbing explosion pressures and explosion debris. Neither of these explosion-containment devices have been adequate. Luggage bombs and fear of their use continue to proliferate.

SUMMARY OF THE INVENTION

In light of need for a better system of protection against luggage-bombing of aircraft, objects of this invention are to provide an aircraft-luggage-bomb protection system which:

Directs explosion pressure and particles from aircraft-luggage bombs out through blow-away plugs in walls of airplanes;

Allows aircraft to be operated safely after in-flight detonation of luggage bombs planted by terrorists;

Provides quick and optionally automatic in-flight replacement of blow-away plugs;

Limits a luggage-bomb explosion to a single luggage-cart portion of an aircraft cargo hold;

Prevents in-flight explosion of luggage bombs from having a debilitating effect on either aircraft or aircraft passengers;

Is more effective and costs less to implement than other luggage-bomb-protection systems;

Can be implemented quicker than other systems of protection against luggage bombing;

Does not require development of untried and unknown protective systems;

Is less vulnerable than other systems to human error and ability of airline employees;

Minimizes criticality of luggage-bomb detection at airports; and

Can be used in combination with luggage-bomb detection as desired.

This invention accomplishes these and other objectives with an aircraft-luggage-bomb protection system having a blow-away plug for each of a plurality of luggage-storage units of a cargo hold of a commercial airplane. Luggage is placed in explosion containers that are positioned over the blow-away plugs. The explosion containers can be structured for select handling equipment such as luggage carts and pallets. The cargo holds are structured for quick and easy conversion between passenger use and airfreight use of planes. Procedural methods are provided.

BRIEF DESCRIPTION OF DRAWINGS

This invention is described by appended claims in relation to description of a preferred embodiment with reference to the following drawings which are described briefly as follows:

FIG. 7 is a side elevation view of a stack of explosion-containment shells;

FIG. 8 is a top view of either a single or a stack of explosion-containment shells;

FIG. 9 is a partially cutaway side view of an explosion-containment shell attached to a loaded luggage pallet and being handled from a top by a lift vehicle;

FIG. 10 is a partially cutaway side view of a loaded luggage pallet positioned to be covered with an explosion-containment shell and being bottom-handled with a lift vehicle; and FIG. 11 is a partially cutaway top view of a luggage pallet.

DESCRIPTION OF PREFERRED EMBODIMENT

Figure 1:
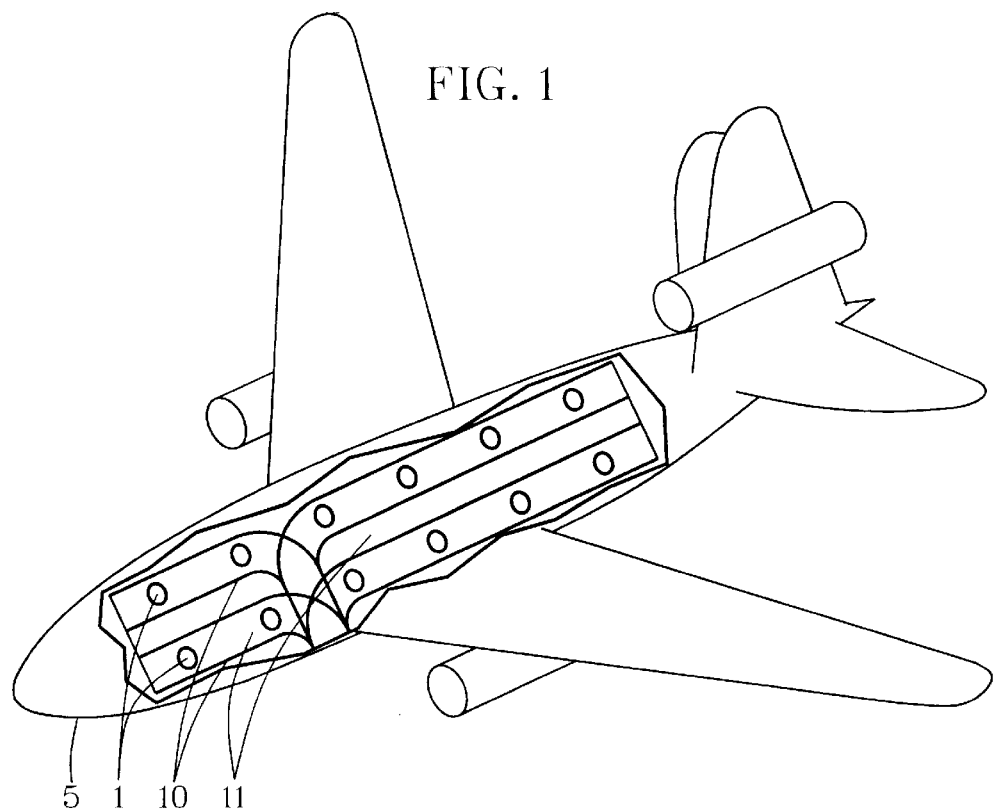
FIG. 1 is a partially cutaway perspective view of an airplane having blow-away plugs and a rail system for positioning explosion containers on luggage carts.
Figure 2:
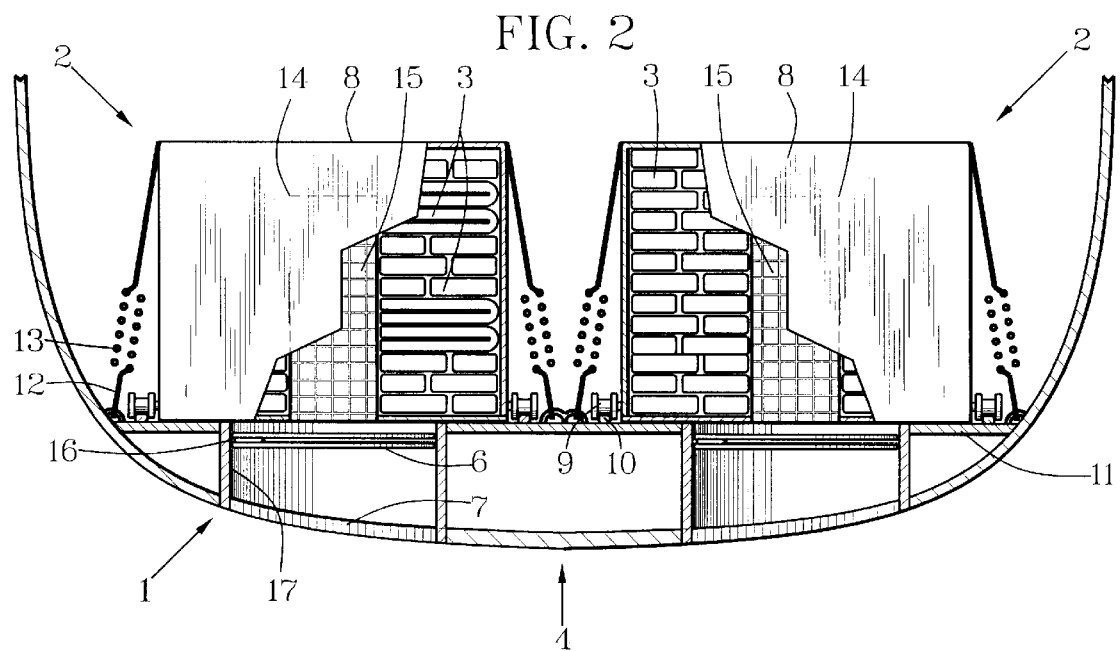
FIG. 2 is a partially cutaway section view of a cargo hold of an airplane in which explosion containers on luggage carts are positioned on blow-away plugs.

Reference is made first to FIGS. 1–2. Blow-away plugs 1 are positioned in line with an entry to explosion containers 2 in which luggage 3 is placed in a cargo section 4 of an airplane 5. The explosion containers 2 are structured and positioned to contain explosion pressure from a detonated luggage bomb while directing explosion pressure to the blow-away plug 1. The blow-away plug 1 is structured and positioned to be opened designedly by explosion pressure from a detonated luggage bomb in the cargo section 4 of the airplane 5, such that explosion pressure from a detonated luggage bomb in luggage 3 is contained by the explosion container 2 while the explosion pressure opens a wall section 6 and a surface section 7 of the blow-away plug 1.

Referring to FIGS. 1–4, the explosion containers 2 can be luggage carts 8 on wheels 9 which can be retractable and can be structured to run on rails 10 to be positioned over the blow-away plugs 1. Explosion containers 2, such as luggage carts 8, are fastened to a floor wall 11 with preferably a pressure-containment fastener 12 that is spring-loaded with a recoil spring 13 having spring force positioned in resistance to increase in distance intermediate a connection of the pressure-containment fastener 12 to the floor wall 11 and a connection of the pressure-containment fastener 12 to the explosion container 2 at a top of the luggage cart 8.

The recoil spring 13 absorbs explosive shock of initial peak pressure of explosion. This decreases required pressure-resistance and resulting weight of the explosion container 2 such as the luggage cart 8.

An explosion-escape chute 14 can be employed to provide communication of explosion pressure with an easy escape to the blow-away plug 1 from a luggage bomb in luggage 3 at any position within the explosion container 2. Grillwork 15 or other porous or easily breakable wall on the explosion-escape chute 14 can be employed to keep luggage 3 from clogging the explosion-escape chute 14.

Explosion pressure of expanding gas from a bomb expands spherically outward initially but follows least lines of resistance that may exist. A least line of resistance that is sufficiently large and free-flowing in a single direction can cause a flow of gas pressure in that single direction. The flow of gas pressure in such a single direction can diminish pressure in other directions to a point of negative or near-negative pressure in some explosion-containment conditions. An adequately quick, easy and large escape route is provided by the explosion-escape chute 14 and the blow-away plug 1 for this embodiment.

The wall section 6 of the blow-away plug 1 can be a circular plate that is seal-fastened with an O-ring 16 in a plug aperture 17 that is cylindrical at a connection perimeter and adequately reinforced. Fluidly downstream from the connection perimeter, the plug aperture 17 can be enlarged with a desired geometrical form to allow the wall section 6 of the blow-away plug 1 to travel without restriction from friction contact of the O-ring 16 with an internal periphery of the plug aperture 17. Shatter connections can be provided in lieu of the O-ring 16 and the wall section 6 also can be disintegrative in order to minimize obstruction of gas flow and to facilitate gas flow to the surface section 7 of the blow-away plug 1.

The wall section 6 of the blow-away plug 1 can be shatter-attached, hinged or attached otherwise to the airplane 5 in a manner that allows the wall section 6 to open or to be removed quickly and easily enough to facilitate directional flow of gas pressure from a detonated luggage bomb.

A pressure-containment door 18 with pressure fasteners 19 can be hinged to the luggage cart 8 to allow bomb-sealed placement and removal of luggage 3.

Figure 5:
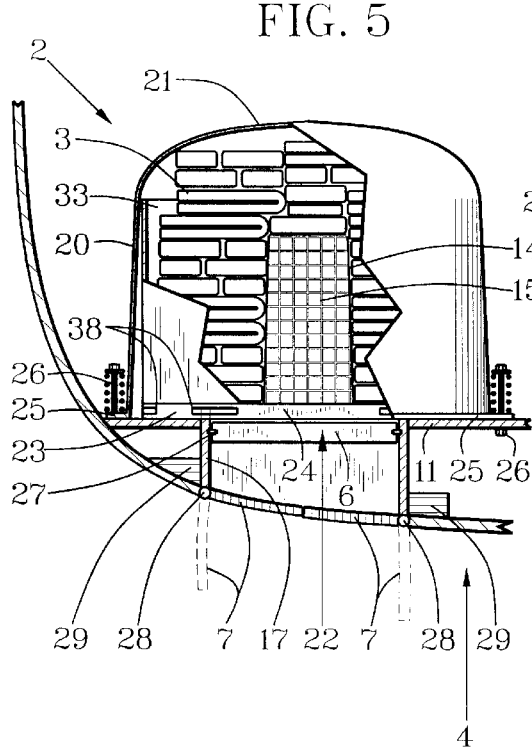
FIG. 5 is a partially cutaway sectional view of a side of a cargo hold over which an explosion-containment shell is positioned over a blow-away plug with hinged doors on a bottom of an airplane.

Referring to FIG. 5, the explosion container 2 can be an explosion-containment shell 20 with unitary construction, rounded corners, tapered walls and a domed top 21 to minimize weight per strength and to maximize effectiveness of directing explosion pressure in a single direction of flow towards a container entry 22. The luggage 3 can be stacked on a luggage pallet 23 having a center section 24 that is designedly open or openable above a wall section 6, a surface section 7 and a plug aperture 17 of a blow-away plug 1.

A shell-fastener means such as a fastener flange 25 on a bottom of the explosion-container shell 20 and a spring-loaded fastener bolt 26 in design pluralities can be provided to seal-fasten the explosion-container shell 20 to the floor wall 11 of the cargo section 4. With the explosion-container shell 20 seal-fastened to the floor wall 11, the center section 24 of the luggage pallet 23 can be used either in place of or in combination with the wall section 6 of the blow-away plug 1. The wall section 6 depicted for use with this embodiment is rectangular and has disintegrative fasteners 27 to a rectangular plug aperture 17.

Figure 3:
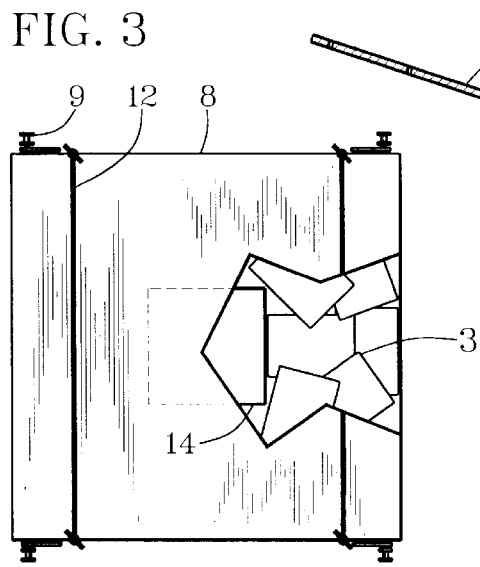
FIG. 3 is a partially cutaway top view of an explosion container on a cart with retractable wheels.
Figure 4:
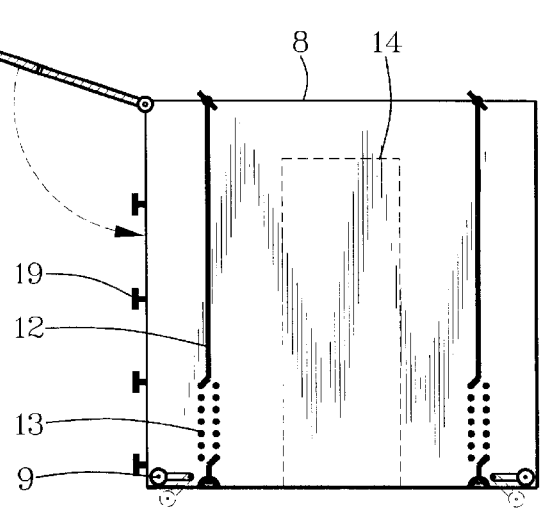
FIG. 4 is a side view of the FIG. 3 illustration with a pressure-containment door hinged open.

An explosion-escape chute 14 with grillwork 15, as described in relation to FIGS. 2–4, is preferable for use with a center section 24 of the luggage pallet 23.

A surface section 7 of the blow-away plug 1 can be hinged with plug hinges 28 to the plug aperture 17 or to the airplane 5 proximate a bottom portion of the plug aperture 17. The plug hinges 28 and oppositely disposed walls of the surface section 7 are preferably parallel or substantially colinear to flight axis of the airplane. Wall actuators 29 can be employed to pivot the surface section 7 back to normal after a luggage-bomb explosion has expelled contents of the explosion-containment shell 20 or other explosion container 2 out of the airplane 5 through the blow-away plug 1. The wall actuator 29 can be operated with a torsion spring automatically or with hydraulic, pneumatic or mechanical means in accordance with design preferences.

An airplane 5 can continue flight without debilitative effect of a luggage bomb when the surface section 7 is closed and an explosion container 2 such as an explosion-containment shell 20 or a luggage cart 8 are seal-fastened to a floor wall 11.

Figure 6:
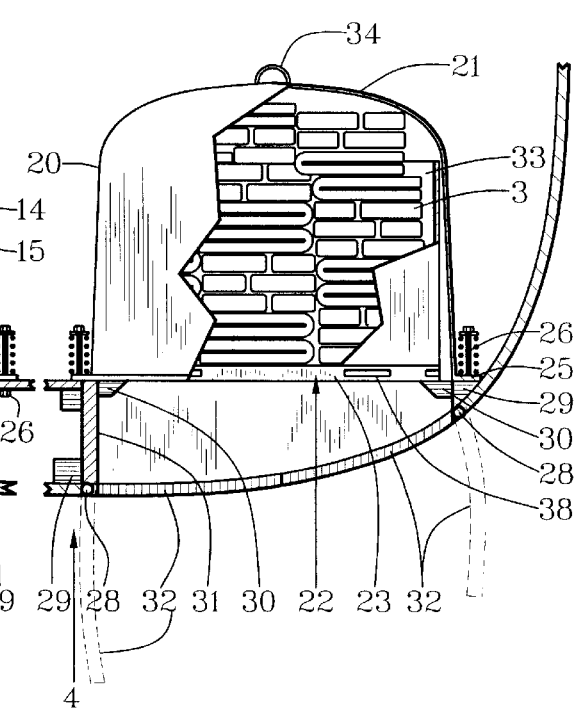
FIG. 6 is a partially cutaway sectional view of a side of a cargo hold over which an explosion-containment shell is positioned over a blow-away plug having a cross-sectional area approximately equal to a cross-sectional area of an entry to the explosion-containment shell.

Referring to FIG. 6, an entire luggage pallet 23 and its contents can rest on pressure-release latches 30 in line with a full-pallet plug aperture 31 and a full-pallet surface section 32. This provides full-pallet release that obviates need for an explosion-escape chute 14. The pressure-release latches 30 and a full-pallet surface section 32 can be pressure-sensitive to open and jettison the luggage pallet 23 and its contents with a designedly small fraction of explosion pressure from a detonated luggage bomb. Seal-fastening of the explosion-containment shell 20 to the floor wall 11 also obviates need for a wall section 6 in a blow-away plug 1. Passengers might not notice explosion of a luggage bomb as an airplane 5 continued on in flight.

Referring to FIGS. 7–11, tapered structure of an explosion-containment shell 20 allows a plurality of them to be stacked telescopically as depicted in FIG. 7. An explosion-escape chute 14 depicted by dashed lines in FIG. 8 is optional, depending on the type and size of blow-away plug 1 employed as described in relation to FIGS. 2 and 5–6.

A luggage pallet 23 can have a gate 40 in pallet walls 33 for loading luggage 3. The lift apertures 38 can be extended from-side-to-side as shown or partway through in accordance with the type of lifting mechanism employed. For using a boom 35 type of lift, the lift apertures 38 need only extend inwardly far enough to contain pressure-release fasteners 39. For versatility allowing use of either tines 37 or a boom 35, the lift apertures 38 can be extended from-side-to-side as shown. If employed, an explosion-escape chute 14, described in relation to FIGS. 2–3 and 5–6, can have a grillwork 15 on top as well as on sides to keep out luggage.

To use the explosion-containment shell 20, luggage 3 can be placed within pallet walls 33 on a luggage pallet 23. Then an explosion-containment shell 20 is positioned on the luggage pallet 23 as shown completed in FIG. 9 and in process in FIG. 10. If the luggage-containment shell 20 is fastened securely to the luggage pallet 23, a loaded luggage pallet 23 can be top-carried from a shell handle 34 with a boom 35 on a mobile lifter 36 as depicted in FIG. 9. If the explosion-containment shell 20 is not fastened securely to the luggage pallet 23, a loaded or unloaded luggage pallet 23 can be carried with tines 37 of a mobile lifter 36 inserted in lift apertures 38 in the luggage pallet 23. Optional to a motorized mobile lifter 36 depicted in FIG. 10 for lifting and moving a loaded or unloaded luggage pallet 23 not fastened to an explosion-containment shell 20 can be a hand-operative or walk-along lift that is not shown. Attachment of the explosion-containment shell 20 to the luggage pallet 23 can be accomplished with pressure-release fasteners 39 that can be used in lieu of or in combination with pressure-release latches 30.

A new and useful aircraft-luggage-bomb protection system having been described, all such foreseeable modifications, adaptations, substitutions of equivalents, mathematical possibilities of combinations of parts, pluralities of parts, applications and forms thereof as described by the following claims and not precluded by prior art are included in this invention.

What is claimed is:

1. An aircraft-luggage-bomb protection system comprising:

at least one blow-away plug in a floor wall of at least one cargo section of an airplane;

an explosion container within which cargo is placed designedly;

the explosion container being structured and positioned in the cargo section to contain explosion pressure from a detonated luggage bomb while directing the explosion pressure to the blow-away plug; and the blow-away plug being structured and positioned to be opened designedly by explosion pressure from a detonated luggage bomb in the cargo section of the airplane, such that explosion pressure from the detonated luggage bomb is contained designedly by the explosion container while the explosion pressure opens the blow-away plug in the floor wall of the cargo section of the airplane to allow escape of the explosion pressure to outside the airplane without loss of the air pressure in the cargo section or the passenger section of the airplane.

2. An aircraft-luggage-bomb protection system as described in claim 1 wherein:

the explosion container has a plurality of side walls, a top wall and a luggage-container floor; and design placement of cargo within the explosion container is within a perimeter of the plurality of side walls, vertically under the top wall and on the luggage-container floor.

3. An aircraft-luggage-bomb protection system as described in claim 2 wherein:

a design side wall of the explosion container is hinged to the explosion container and fixable shut to prevent escape of explosive pressure from a detonated luggage bomb in the explosion container.

4. An aircraft-luggage-bomb protection system as described in claim 3 wherein:

the explosion container has luggage-cart wheels for use of the explosion container as a luggage cart.

5. An aircraft-luggage-bomb protection system as described in claim 4 wherein:

the luggage-cart wheels are retractable to where the floor of the explosion container is on a floor wall of the cargo section of the airplane at a position vertically above the blow-away plug.

6. An aircraft-luggage-bomb protection system as described in claim 5 wherein:

the explosion container is attachable to the floor wall of the cargo section of the airplane with a pressure-containment fastener.

7. An aircraft-luggage-bomb protection system as described in claim 6 wherein:

the pressure-containment fastener is spring-loaded with a recoil spring having spring force positioned in resistance to increase in distance intermediate a connection of the pressure-containment fastener to the floor wall of the cargo section and a connection of the pressure-containment fastener to the explosion container.

8. An aircraft-luggage-bomb protection system as described in claim 7 wherein:

the explosion container has an explosion-escape chute extended designedly from a central portion of the floor of the explosion container to design proximity to the top wall of the explosion container.

9. An aircraft-luggage-bomb protection system as described in claim 7 wherein:

the luggage-container floor of the explosion container has a central portion that is pressure-removable with an initial portion of explosion pressure from a luggage-bomb explosion and positioned vertically above a blow-away plug in a floor of the cargo section of the airplane.

10. An aircraft-luggage-bomb protection system as described in claim 8 wherein:

the explosion-escape chute has a pressure-communicative periphery.

11. An aircraft-luggage-bomb protection system as described in claim 10 wherein:

the pressure-communicative periphery is porous with a grillwork.

12. An aircraft-luggage-bomb protection system as described in claim 10 wherein:

the pressure-communicative periphery is pressure-rupturable with an initial portion of explosion pressure from a luggage bomb that is detonated at a position surrounding the explosion-escape chute.

13. An aircraft-luggage-bomb protection system as described in claim 5 wherein:

the cargo section of the airplane has a rail system positioned to guide wheels on explosion containers to positions proximate blow-away plugs in floor walls of the cargo section of the airplane selectively.

14. An aircraft-luggage-bomb protection system as described in claim 1 wherein:

the explosion container is an explosion-containment shell having an inside periphery vertically above a shell entry;

the explosion-containment shell is structured to be positioned on a luggage pallet containing luggage;

an inside periphery of the shell entry is positioned proximate a floor of the luggage pallet; and an inside periphery of the explosion-containment shell is positioned exterior to luggage on the luggage pallet, such that luggage is positioned in the explosion-containment shell with the explosion-containment shell being also part of a luggage container.

15. An aircraft-luggage-bomb protection system as described in claim 14 wherein:

the luggage pallet containing luggage positioned in an explosion-containment shell is structured to be positioned on a floor wall of the airplane vertically above the blow-away plug; and the explosion-containment shell is attachable to the floor wall of the airplane with a pressure-containment fastener.

16. An aircraft-luggage-bomb protection system as described in claim 15 wherein:

the pressure-containment fastener is spring-loaded with a recoil spring having spring force positioned in resistance to increase in distance intermediate a connection of the pressure-containment fastener to the floor wall of the cargo section and a connection of the pressure-containment fastener to the explosion-containment shell.

17. An aircraft-luggage-bomb protection system as described in claim 14 wherein:

the pressure-containment shell is tapered inwardly from-bottom-to-top designedly, such that explosion pressure can be directed effectively towards the shell entry after initial explosion pressure has established a direction of flow of pressure through a blow-away plug that has been opened by initial pressure of explosion of a luggage bomb within the pressure-containment shell, such that weight can be minimized per pressure-containment capacity and such that a plurality of pressure-containment shells not in use can be stacked telescopically to conserve storage space.

18. An aircraft-luggage-bomb protection system as described in claim 17 wherein:

the luggage pallet has an explosion-escape chute in explosion-pressure communication intermediate a top portion of luggage on the luggage pallet and a floor of the luggage pallet.

19. An aircraft-luggage-bomb protection system as described in claim 18 wherein:

the luggage pallet has lifter spaces for inserting grasper projections of pallet-handling equipment intermediate a load surface on a top of the luggage pallet and a bottom of the luggage pallet.

20. An aircraft-luggage-bomb protection system as described in claim 19 wherein:

the luggage pallet has a non-abrasive surface that is void of projections to avoid damage to luggage.

21. An aircraft-luggage-bomb protection system as described in claim 19 wherein:

the lifter spaces are lift bays on sides of the luggage pallets.

22. An aircraft-luggage-bomb protection system as described in claim 1 and includes a pressure-release section of the floor wherein:

the blow-away plug includes at least one wall section of a blow-way plug that is a section of floor of the cargo section of the airplane;

the blow-away plug is positioned vertically under a portion of floor of the cargo section of the airplane where a luggage-containing explosion container is designed to be placed; and the pressure-release section of the floor is in line with at least one surface section of a blow-away plug that is a section of surface of the airplane.

23. An aircraft-luggage-bomb protection system as described in claim 22 wherein:

the wall section of the blow-away plug is sealed to surrounding floor of the cargo section of the airplane with an O-ring seal.

24. An aircraft-luggage-bomb protection system as described in claim 22 wherein:

the surface section of the blow-away plug is at least one door that is hinged to the surface of the airplane with a hinge having an axis that is generally in line with an end-to-end axis of the airplane.

25. An aircraft-luggage-bomb protection system as described in claim 24 wherein:

the at least one door that is hinged to the surface of the airplane as a pressure-release surface of the airplane is pivotal from an open position caused by explosion pressure to a closed position with a design door actuator.

26. A method comprising the following steps for protection against luggage bombs in aircraft:

structuring aircraft with at least one blow-away plug in at least one floor wall of at least one cargo section of the airplane;

providing an explosion container that is capable of containing explosion pressure of a detonated luggage bomb while directing the explosion pressure to the blow-away plug and continuing to contain the explosion pressure while the blow-away plug is opened by the explosion pressure, without loss of air pressure in the cargo section or the passenger section of the airplane and while the explosion pressure escapes through the opening occupied by the blow-away plug.

27. A method as described in claim 26 and further comprising a step of providing a pressure conveyance as an explosion escape chute in fluid communication from amongst the luggage on the luggage-container floor to the blow-away plug in order to facilitate flow of explosion pressure towards the blow-away plug and thereby to establish directional flow of explosion pressure out through the blow-away plug and thereby to minimize explosion pressure against walls of the explosion container, such that weight of the explosion container required for containing explosion pressure can be diminished.

28. A method as described in claim 26 and further comprising a step of attaching the explosion container to the wall of the cargo section of the airplane with a resilient expansion-resistant means in order to absorb initial explosion pressure.

* * * * *